2,977,372

PROCESS FOR PREPARING SUBSTITUTED TETRAZOLES

William G. Finnegan and Robert H. Boschan, China Lake, Calif., assignors to the United States of America as represented by the Secretary of the Navy No Drawing. Filed Apr. 9, 1958, Ser. No. 727,498

8 Claims. (Cl. 260—308)

(Granted under Title 35, U.S. Code (1952), sec. 266)

The invention described herein may be manufactured and used by or for the Government of the United States of America for governmental purposes without the payment of any royalties thereon or therefor.

This invention relates to an improved process for preparing 5-substituted tetrazoles.

In the past, 5-substituted tetrazoles have been prepared (1) by heating nitriles with hydrazoic acid in benzene solution or a mixture of sodium azide and acetic acid in ethyl alcohol, isopropyl alcohol or n-butyl alcohol at temperatures of 100° to 150° C. for three to six days in a pressure vessel, (2) by converting the nitriles in turn into imino ether salts and then into hydrazidines, which may be converted into 5-substituted tetrazoles by diazotization and cyclization. (3) A recently described synthesis involves the reaction of nitriles with aluminum azide in tetrahydrofuran as the solvent (C. H. Behringer and K. Kohl, Ber. 89, 2648—1956). The first method has the disadvantage that it required the use of a pressure reaction vessel, long reaction times and the preparation of benzene solutions of hydrazoic acid. Hydrazoic acid is exceedingly toxic and explosive so that its use requires great caution. The second method is a three step procedure yielding easily hydrolyzable intermediates, and giving poor to moderate yields of final given for the third method indicates that only one third of the available azide groups are utilized.

According to the present invention, 5-substituted tetrazoles are produced safely within reasonable reaction times by the reaction in a suitable solvent of an azide salt with an organic nitrile. The preferred azide and solvent are ammonium azide and dimethyl formamide, respectively. Examination of the experimental evidence repectively. The ammonium azide or other suitable azide is formed in situ by a double decomposition reaction of the alkali metal azide and an appropriate ammonium halide salt, such as ammonium chloride.

The following examples illustrate the process of the invention.

TABLE I

| Nitrile [a] | Azide | Temp., °C. | Time, Hr. | Product | Yield, Percent |
|---|---|---|---|---|---|
| $C_6H_5CN$ | $NH_4N_3$ | 100 | 3 | $5\text{-}(C_6H_5)CHN_4$ | 75.6 |
| $C_6H_5CN$ | $NH_4N_3$ | 100 | 7 | $5\text{-}(C_6H_5)CHN_4$ | 87.5 |
| $C_6H_5CN$ | $NH_4N_4$ | 125 | 3 | $5\text{-}(C_6H_5)CHN_4$ | 88.0 |
| $C_6H_5CN$ | $NH_4N_3$ | 125 | 7 | $5\text{-}(C_6H_5)CHN_4$ | 100 |
| $4\text{-}H_2NC_6H_4CN$ | $NH_4N_3$ | 100 | 3 | $5\text{-}(4\text{-}H_2NC_6H_4)CHN_4$ | 10 |
| $4\text{-}CH_3OC_6H_4CN$ | $NH_4N_3$ | 100 | 3 | $5\text{-}(4\text{-}CH_3OC_6H_4)CHN_4$ | 43.2 |
| $4\text{-}CH_3C_6H_4CN$ | $NH_4N_3$ | 100 | 3 | $5\text{-}(4\text{-}CH_3C_6H_4)CHN_4$ | 64 |
| $4\text{-}O_2NC_6H_4CN$ | $NH_4N_3$ | 100 | 3 | $5\text{-}(4\text{-}O_2NC_6H_4)CHN_4$ | 96.9 |
| $4\text{-}NCC_6H_4CN$ | $NH_4N_3$ | 100 | 3 | $5\text{-}(4\text{-}NCC_6H_4)CHN_4$ | 90.5 |
| $4\text{-}NCC_6H_4CN$ [b] | $NH_4N_3$ | 125 | 7 | $5\text{-}(4\text{-}CHN_4C_6H_4)CHN_4$ | 100 |
| $4\text{-}NCC_6H_4CN$ | $NaN_3$ | 100 | 7 | $5\text{-}(4\text{-}NCC_6H_4)CHN_4$ | 54.2 |
| $C_6H_5CH_2CN$ | $NH_4N_3$ | 125 | 7 | $5\text{-}(C_6H_5CH_2)CHN_4$ | 84.1 |
| $C_3H_7CN$ | $NH_4N_3$ | 125 | 24 | $5\text{-}(C_3H_7)CHN_4$ | ca. 100 |
| $C_7F_{15}CN$ | $NH_4H_3$ | 100 | 8 | $5\text{-}(C_7F_{15})CHN_4$ | 100 |
| $C_2H_5O_2CCH_2CN$ | $NH_4N_3$ | 100 | 7 | $5\text{-}(C_2H_5O_2CCH_2)CHN_4$ | 59.1 |
| $C_2H_5O_2CCH_2CN$ | $NH_4N_3$ | 100 | 7 | $5\text{-}(C_2H_5O_2CCH_2)CHN_4$ | 55.1 |
| $HOCH_2CH_2CN$ | $NH_4N_3$ | 125 | 16 | $5\text{-}(HOCH_2CH_2)CHN_4$ | 82.8 |
| $HOCH_2CH_2CN$ [c] | $NH_4N_3$ | 125 | 16 | $5\text{-}(HOCH_2CH_2)CHN_4$ | 85.8 |
| $HOCH_2CH_2CN$ [d] | $NH_4N_3$ | 125 | 16 | $5\text{-}(HOCH_2CH_2)CHN_4$ | 91.8 |
| $HOCH_2CH_2CN$ [e] | $NH_4N_3$ | 125 | 16 | $5\text{-}(HOCH_2CH_2)CHN_4$ | 90 |

[a] Unless otherwise stated the molar ratio of nitrile to azide was 1:1.1; the nitrile concentration was 2.0 moles per liter of dimethylformamide.
[b] The ratio of nitrile to azide was 1I2.2.
[c] The ratio of nitrile to azide was 1I1.5.
[d] The ratio of nitrile to azide was 1I2.
[e] The ratio of nitrile to azide was 1I1.5; the nitrile concentration was four moles per liter of dimethylformamide.

Other suitable solvents which may be used in addition to dimethylformamide are ethyl and methyl Cellosolve, dimethylsulfoxide and ethyl alcohol. Dimethylformamide is preferred because it is a good solvent for sodium azide so that its use provides a concentrated reaction system. Reaction systems using ammonium azide or lithium azide are both concentrated and homogeneous. Dimethylsulfoxide is an equally good solvent but its use makes isolation of the product difficult. The range of temperatures required for the reaction is between 75° C. to 150° C. Required reaction times seldom reach 24 hours as will be noted from the table. In general, the rate of reaction increases with an increase in temperature and an increase in the electronegativity of the group attached to the nitrile. The mechanism of the reaction appears to be a nucleophilic attack of azide ion on the carbon of the nitrile group to produce an imino azide, which cyclizes in turn to yield the tetrazole ring. Ammonium azide is a better reactant than sodium azide, due to its better solubility in dimethylformamide and due to the fact that it, or one of its protons, coordinates with the nitrile nitrogen, and produces a positive charge on the nitrile carbon. This positive charge facilitates the azide ion attack. The advantage of an ammonium azide salt over an alkali metal azide salt for this reaction can be readily seen from the data in the following table.

TABLE II

*Conversion of nitriles to 5-substituted tetrazoles*

[Molar ratio of nitrile to azide—1:1.1, nitrile concentration—2 moles per liter of dimethylformamide]

| Nitrile | Azide | Time, Hrs. | Temp., °C. | Product | Yield, Percent |
|---|---|---|---|---|---|
| $C_6H_5CN$ | $NaN_3$ | 7 | 125 | $C_6H_5CHN_4$ | 24.9 |
| $C_6H_5CN$ | $LiN_3$ | 7 | 125 | $C_6H_5CHN_4$ | 48.6 |
| $C_6H_5CN$ | $NH_4N_3$ | 7 | 125 | $C_6H_5CHN_4$ | 100 |
| $C_6H_5CN$ | $(CH_3)_2NH_2N_3$ | 3 | 100 | $C_6H_5CHN_4$ | 90.6 |
| $C_3H_7CN$ | $NaN_3$ | 24 | 125 | | 0 |
| $C_3H_7CN$ | $LiN_3$ | 24 | 125 | $C_3H_7CHN_4$ | 4.9 |
| $C_3H_7CN$ | $NH_4N_3$ | 24 | 125 | $C_3H_7CHN_4$ | 73.5 |

The more electronegative nitriles, however, can be converted to tetrazoles in good yield, by reaction with sodium azide since a positive charge is produced on the nitrile carbon by the electron attracting power of the electronegative substituent. Evidence to support the concept that the reaction proceeds by way of the azide ion attack on the nitrile is found in the comparison of the reaction of ethyl cyanoacetate with hydrazoic acid in benzene and n-propyl alcohol solutions and with ammonium azide in ethanol and dimethylformamide solutions. A six day reaction at 100° C. is required to obtain a 22.9 percent yield of ethyl 5-tetrazolyl acetate using hydrazoic acid in benzene solution; a five day reaction at 75° C. gave no yield when hydrazoic acid in n-propyl alcohol solution was used. By way of comparison, a 51.5 percent yield was obtained in three days at 100° C. using ammonium azide in ethanol. The 81 percent yield obtained in eight hours at 95° C. using ammonium azide in dimethylformamide solution, emphasized the desirability of the solvent for the reaction. The products in the above reactions were isolated by vacuum distilling the solvent, dissolving the residue in water, acidifying the solution with mineral acid and removing the product by filtration when it proved insoluble in water, or by extraction with a suitable solvent when it proved to be soluble in water. The products of the above reactions were identified by standard methods of analysis and identification.

The reaction sequence of the process is illustrated by the following equations for the reaction of an organic nitrile with sodium azide and ammonium chloride.

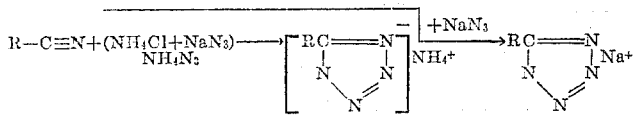

Compounds other than ammonium chloride which may be used with the alkali metal azide to form ammonium azide derivatives are dimethyl ammonium chloride, trimethylammonium chloride, di-n-butylammonium chloride, aniline hydrochloride, piperidinium chloride, morpholinium chloride and tetramethylammonium chloride. Lithium chloride may also be used in place of the ammonium chloride. Catalytic quantities of ammonium compounds may be used and have a considerable effect on the reaction of nitriles with alkali metal azides. This information is shown in the following table.

TABLE III

*Conversion of benzonitrile to 5-phenyltetrazole*

[0.2 mole of benzonitrile, 7 hrs. at 123–127° C., 100 ml. of dimethyl formamide and 0.22 mole of sodium azide]

| Added Salt | Amount | Yield, Percent |
|---|---|---|
| None | | 24.9 |
| n-$(C_4H_9)NH_2Cl$ | 5 mole percent (based on $N_2N_3$) | 51.6 |
| $C_6H_5NH_3Cl$ | 5.8 mole percent | 57.2 |
| $C_6H_5NH_3Cl$ | 10 mole percent | 73.8 |
| $NH_4Cl$ | 10 mole percent | 59.6 |

The invention provides a simplified method for making 5-substituted tetrazoles in reaction times of less than 24 hours. The reaction can be carried out within a practicable temperature range, is safe in operation and produces good yields.

The utility of the tetrazoles is well known in the art. Certain of them are used for medicinals. Their utility as a class is set forth in U.S. Patent Number 2,480,852 and also in pending U.S. patent application Serial Number 574,939, filed in the U.S. Patent Office on March 29, 1956.

Obviously, many modifications and variations of the present invention are possible in the light of the above teachings. It is therefore to be understood that within the scope of the appended claims the invention may be practiced otherwise than as specifically described.

What is claimed is:

1. The process for preparing 5-substituted tetrazoles which comprises reacting for periods up to about 24 hours at a temperature from about 75° C. to about 150° C. a nitrile from the class consisting of benzo-nitrile, amino substituted benzo-nitriles, lower alkoxy substituted benzo-nitriles, lower alkyl substituted benzo-nitriles, nitro substituted benzo-nitriles, cyano substituted benzo-nitriles, aralkyl nitriles, lower alkyl nitriles, perfluoro lower alkyl nitriles, carbethoxy lower alkyl nitriles and alkanol nitriles and an alkali metal azide in a solvent from the class consisting of ethyl alcohol, methyl Cellosolve, ethyl Cellosolve, dimethylformamide and dimethylsulfoxide in the presence of a reactant selected from the class consisting of ammonium chloride, dimethylammonium chloride, trimethylammonium chloride, di-n-butylammonium chloride, aniline hydrochloride, piperidinium chloride, morpholinium chloride, tetramethylammonium chloride, and lithium chloride.

2. The process of claim 1 in which the solvent is dimethylformamide.

3. The process of claim 1 in which the azide is sodium azide.

4. The process of claim 1 in which the reactant is ammonium chloride.

5. The process of claim 1 in which the azide is sodium azide, the reactant is ammonium chloride, and the solvent is dimethylformamide.

6. The process for preparing 5-substituted tetrazoles which comprises reacting for periods up to about twenty-four hours at a temperature from about 75° C. to about 150° C. an organic nitrile from the group consisting of benzo-nitrile, amino substituted benzo-nitriles, lower alkoxy substituted benzo-nitriles, lower alkyl substituted benzo-nitriles, nitro substituted benzo-nitriles, cyano substituted benzo-nitriles, aralkyl nitriles, lower alkyl nitriles, perfluoro lower alkyl nitriles, carbethoxy lower alkyl nitriles and alkanol nitriles and an azide from the class consisting of ammonium azide and lower alkyl substituted ammonium azide in a solvent from the class consisting of ethyl alcohol, methyl Cellosolve, ethyl Cellosolve, dimethylformamide and dimethylsulfoxide.

7. The process of claim 6 in which the solvent is dimethylformamide.

8. The process of claim 6 in which the solvent is dimethylformamide and the azide is ammonium azide.

No references cited.